US012737941B2

(12) United States Patent
Steed et al.

(10) Patent No.: US 12,737,941 B2
(45) Date of Patent: Sep. 15, 2026

(54) METAMERISATION OF IMAGES

(71) Applicant: UCL Business Ltd, London (GB)

(72) Inventors: Anthony Steed, Hertfordshire (GB); Tobias Ritschel, Wiesbaden (DE); David Walton, Watford (GB); Rafael Kuffer Dos Anjos, London (GB); Kaan Aksit, London (GB); Sebastion Friston, London (GB); David Swapp, Harpenden (GB)

(73) Assignee: UCL Business PLC, London (GB)

( * ) Notice: Subject to any disclaimer, the term of this patent is extended or adjusted under 35 U.S.C. 154(b) by 49 days.

(21) Appl. No.: 18/574,879

(22) PCT Filed: Jun. 28, 2022

(86) PCT No.: PCT/GB2022/051659
§ 371 (c)(1),
(2) Date: Dec. 28, 2023

(87) PCT Pub. No.: WO2023/275534
PCT Pub. Date: Jan. 5, 2023

(65) Prior Publication Data

US 2024/0355016 A1 Oct. 24, 2024

(30) Foreign Application Priority Data

Jun. 30, 2021 (GB) ..................................... 2109425

(51) Int. Cl.
*G06T 11/40* (2006.01)

(52) U.S. Cl.
CPC .................................... *G06T 11/40* (2013.01)

(58) Field of Classification Search
CPC ......... G06T 11/40; G06T 7/11; H04N 13/332; H04N 13/344
See application file for complete search history.

(56) References Cited

U.S. PATENT DOCUMENTS 11,227,449 B2 * 1/2022 Breugelmans .......... G06T 11/40
2017/0272722 A1 9/2017 Salvi et al.
(Continued)

OTHER PUBLICATIONS

Aug. 10, 2022—(WO) International Search Report and Written Opinion—PCT/GB2022/051659.
(Continued)

*Primary Examiner* — Antonio A Caschera
(74) *Attorney, Agent, or Firm* — Banner & Witcoff, Ltd.

(57) ABSTRACT

A method for creating a metamer for an image for a display, the method comprising receiving a first input image, dividing the input image into a plurality of regions comprising a foveal region and at least one peripheral region, wherein each region of the plurality of regions comprises a plurality of pixels, determining, for each of the at least one peripheral region, the distribution of statistics associated with each of the at least one peripheral region, for each of the at least one peripheral region, identifying a metamer for the peripheral region wherein the metamer has similar and/or identical distribution of statistics to the associated peripheral region, and creating an output image based on the foveal region and the metamer for each of the at least one peripheral region such that the peripheral region of the output image is perceived to be the same as the peripheral region of the input image when perceived by a viewer of the image.

17 Claims, 8 Drawing Sheets

(56) References Cited

U.S. PATENT DOCUMENTS

| | | | |
|---|---|---|---|
| 2017/0316601 A1 | 11/2017 | Kakarlapudi et al. | |
| 2018/0136720 A1* | 5/2018 | Spitzer | G06T 1/20 |
| 2018/0261003 A1* | 9/2018 | Peli | G06F 3/013 |

OTHER PUBLICATIONS

Rosenholtz Ruth et al., "Rethinking the Role of Top-Down Attention in Vision: Effecrs Attributable to a Lossy Representation in Peripheral Vision", Frontiers in Psychology, vol. 3, Feb. 6, 2012.
Tursun T. et al., "Luminance-Contrast-Aware Foveated Rendering", ACM Transactions on Graphics, vol. 38, No. 4, Jul. 12, 2019.

* cited by examiner

METAMERISATION OF IMAGES

CROSS-REFERENCE TO RELATED APPLICATIONS

This application is a U.S. National Stage application under 35 U.S.C § 371 of International Application PCT/GB2022/051659, filed Jun. 28, 2022, which claims the benefit of priority to United Kingdom Patent Application GB 2109425.5,filed Jun. 30, 2021. Benefit of the filing date of each of these prior applications are hereby claimed. Each of these prior applications are hereby incorporated by reference in their entirety.

TECHNICAL FIELD

The present disclosure relates to a system and method for rendering images on a display. In particular, but not exclusively, the system and method are used for Near-Eye Displays.

BACKGROUND

In many contexts, graphics, or images, are most usually rendered by a device incorporating a graphics processing unit (GPU) as part of an image processing pipeline. GPUs are found, and used, in multiple devices such as mobile devices, head mounted displays (HMDs), personal computers, games consoles, Near-Eye Displays (NEDs) etc.

In the case of displays such as NEDs, a large proportion of the user's visual field is covered. Doing so at a high enough resolution to match the human vision in the fovea requires substantial computational power and bandwidth resources. The Human Visual System (HVS) however, only resolves fine spatial details in its fovea but not in the periphery. Uniform sampling in conventional displays means that an entire image or frame of video data must be rendered and drawn at the highest resolution even though only a small region is visible at any time. Since the fovea has a high resolution, and as displays subsume more of the visual field—as with NED—the computational load increases quadratically or more.

It is known in the art to use foveated rendering in such displays. Foveated rendering focusses computational effort to the fovea and shows a band-limited (i.e. blurry) version of the image in its periphery which is computed from fewer samples. However, such blur can be perceived as unnatural and does not match well to what the HVS actually perceives.

It is also known to use ray-tracing in such displays. Ray-tracing can cast more rays to the foveal area (foveation) and update the view parameters during image generation. However, ray-tracing is processing intensive and typically remains too slow in large and dynamic scenes.

It is also known to use a neural network to reconstruct an image from samples of video frames that are dense in the fovea and sparse in the periphery. The method works with high temporal-resolution video, so every pixel is covered by a sample after a few frames. However, the loss is the same in the periphery and fovea, and does not consider their different perceptual characteristics as determined by the viewer.

As such there is a desire to be able to render images on displays, in particular but not limited to, on NEDs which account for the differences in an end user's perception of the image in the fovea and the periphery.

SUMMARY OF THE INVENTION

Aspects and embodiments of the invention provide a system and method for creating a metamer for an input image as claimed in the appended claims.

According to an aspect of the invention there is provided a method of creating a metamer from an input image, the method comprising: receiving a first input image; dividing the input image into a plurality of regions comprising a foveal region and at least one peripheral region, wherein each region of the plurality of regions comprises a plurality of pixels; determining, for each of the at least one peripheral region, the distribution of statistics associated with each of the at least one peripheral region; for each of the at least one peripheral region, identifying a metamer for the peripheral region wherein the metamer has similar and/or identical distribution of statistics to the associated peripheral region; and creating an output image based on the foveal region and the metamer for each of the at least one peripheral region such that the peripheral region of the output image is perceived to be the same as the peripheral region of the input image when perceived by a viewer of the image.

Such a process allows for a metamerisation process where the image is rendered in a manner which lowers the computational requirement without a perceived drop in quality for the user. By relying on metamers to construct the peripheral regions of output images, the computational cost is reduced whilst the user's perception of the image is unchanged, as the user's eyes perceptual capabilities are lower (e.g. spatial resolving power is lower) in these regions and the user is therefore unable to perceive the drop in resolution. This method therefore improves upon the fidelity of blurring, while retaining its efficiency.

Optionally the method further comprising compressing the foveal region and the distribution of the statistics for each of the at least one peripheral region to produce updated statistics to identify a metamer for each of the at least one peripheral region wherein the updated statistics resemble the distribution of the original statistics for each peripheral region.

Optionally the method further comprising accessing, for each of the at least one peripheral region, the statistics of a stored texture having the same texture as the peripheral region and generating the metamer from these statistics.

Optionally wherein the input image is a frame of video data.

Optionally wherein the distribution of the statistics are the mean and variance of the statistics. Optionally wherein the step of determining the distribution of statistics comprises constructing a cubic MIP map of each level of the pyramid, reading a mean map from the MIP map, and computing the variance map from a MIP map of the squares of each level.

Optionally the method further comprising converting the input image into a decorrelated colour space before dividing the image into a plurality of regions. Beneficially, converting the image to a decorrelated colour space is beneficial as co-statistics between feature channels are not captured in this process.

Optionally the method further comprising converting the input image into a steerable pyramid comprising a plurality of levels before dividing the image into a plurality of regions. Optionally wherein the steerable pyramid applies a pair of direction sensitive filters to every level of the pyramid followed by a sub-sampling step. Optionally wherein the filters are compact filters for a real-time application. Steerability assures that the response at in-between orientations is a linear combination of the response at the directions in which the filters are applied. Converting the input image to a pyramid is beneficial as an image pyramid is ideal to capture features at all scales and features related to changes over space. An image pyramid is ideal to capture both properties.

Optionally wherein the foveal region and the distribution of statistics are compressed by warping the foveal region and the distribution of statistics by calculating a Cumulative Density Function to produce a map of statistics with a controlled pixel density. Optionally wherein the foveal region and the distribution of statistics are further compressed by remapping each channel of each statistics map linearly to [0, 255] and quantizing each map to 8 bits per channel. Optionally wherein the density function in the at least one peripheral region is larger than the density function in the foveal region.

There is also provided a system for creating a metamer for an input image, the system comprising: a display for rendering an image; and a processor configured to execute any of the above recited method steps. Optionally wherein the display is a near eye display.

There is also provided a computer program product comprising instructions which, when the program is executed by a computer, cause the computer to carry out any of the above recite method steps.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

The present invention provides a system and method for creating metamers for input images. In particular, but not exclusively, the present invention may be used in near eye displays (NEDs) where issues regarding latency and field of view are more prevalent. The present invention may be used in all types of displays, in particular where foveated imaging is used. Such displays include augmented reality displays and those found on mobile devices, tablet computers, portable computers etc.

A metamer is an image which is different to a source image but when viewed by the end user is perceived to be the same as the source image when observed in the periphery. Thus whilst the metamer is different to the source image, when viewed in the periphery of the eye, where the user's eyes perceptual capabilities are lower, the perception of the image is the same. This is a result of certain statistics of the source and metamer images being identical. Statistics can refer to soft counting such as how often a feature (i.e. an edge) appears in a spatial pooling region of the visual field. Pooling means that the spatial location of features is irrelevant and only their aggregate statistics matter.

The invention disclosed herein relates to a metamerisation pipeline. As explained in detail below, metamerisation is the process of analysing an image, or parts of an image, based on how the image will be perceived by the end user and providing a metamerised output image which is perceived the same as the input image. Advantageously by selecting the metamer the data required to encode the image may be reduced, without any perceived difference in the image.

In all examples, an aspect of the invention is to provide an improved image processing method which allows for the image to be adapted and rendered in a manner which improves upon the fidelity of blurring, while retaining its efficiency.

Figure 1:
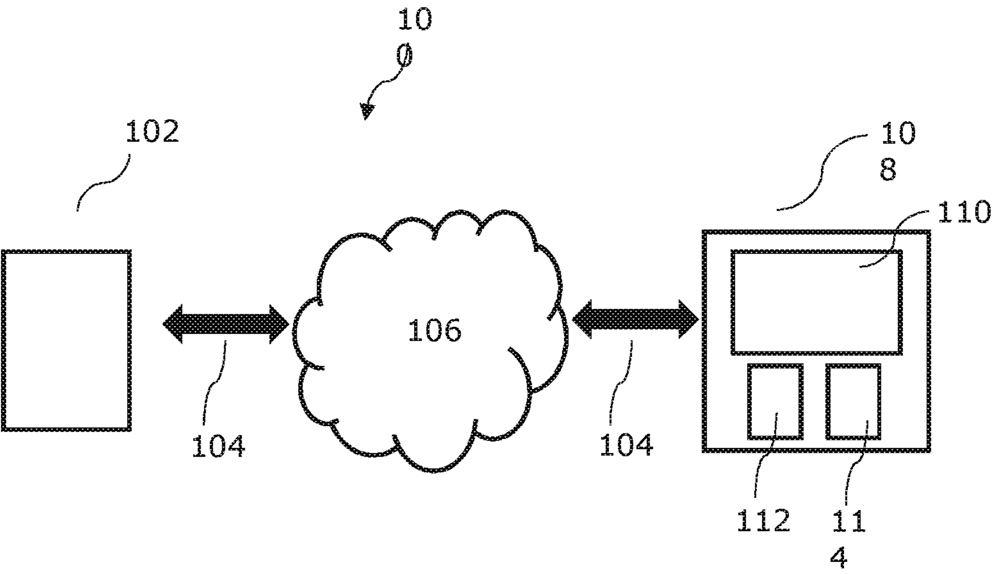
FIG. 1 is a schematic representation of the apparatus according to an aspect of the invention.

FIG. 1 is a schematic representation of the system for implementing the metamerisation pipeline in accordance with an embodiment of the invention. Whilst FIG. 1 is shown with reference to a computer with a near eye display (NED) in further embodiments other forms of display and computing devices may be used, such as mobile devices.

In FIG. 1 there is shown a system 100 for performing a metamerisation method to create a metamer for an input image. The system 100 comprises a server 102 which is arranged to deliver image data 104 over a network 106, such as a data network, to one or more computing devices 108, each computing device 108 enabled to perform the metamerisation method described herein.

The image data 104 can be individual images or can be one or more videos. Preferably, the image data is a video in which a metamer can be output for individual frames of the video data.

The server 102 can be any suitable data storage and delivery server which is able to deliver encoded data to the computing device 108 over the network 106. Such servers are well known in the art, and may use any appropriate unicast and multicast protocols. The server 102 has significantly more computational power than the computing device 108.

The computing device 108 can be any suitable device such as tablet computers, laptop computers, desktop computers, video conferencing suite etc.

The network 106 can be any type of data network suitable for connecting two or more computing devices together, such as a local area network or a wide area network, and can include terrestrial wireless and wired connections, and satellite connections. The network 106 may also be or include telecommunications networks, and in particular telecommunications networks that provide cellular data coverage. Preferably the network 106 would include the Internet, and connections thereto.

The computing device 108 comprises a display 110 which is connected to, or integrated within, the computing device 108. In an embodiment the display 110 is a near eye display (NED). In further embodiments the display 110 is another form of display such as a desk mounted light emitting diode (LED), organic LED (OLED) display, stereo display etc.

The computing device 108 further comprises a known graphics processing unit (GPU) 112, and processor 114. The processor 114 is configured to execute the metamerisation method described herein.

Whilst FIG. 1 shows a GPU 112, other processing means may be used. For example, the computing device may comprise a video processor, a custom application-specific integrated circuit (ASIC), or a video encoder/decoder.

Computing device 108 and server 102 do not need to be physically separated by a network, but can also be logical parts of one software system on one machine. For example, the method may be carried out using a multi-processor configuration on fast buses in a single computing device.

Figure 2:
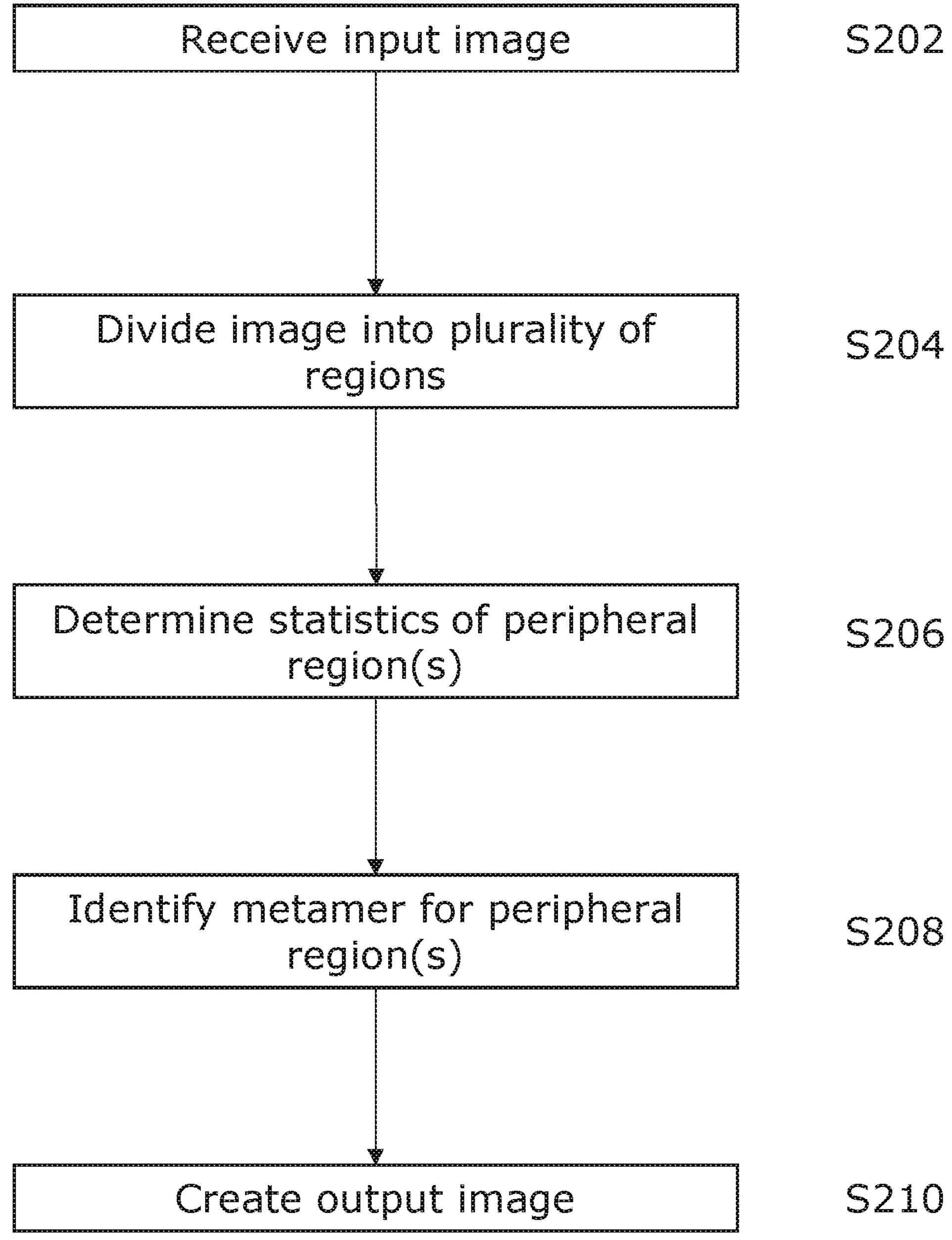
FIG. 2 is a flow chart of the process of creating a metamer according to an aspect of the invention.

FIG. 2 is a flow chart of the process of metamerisation of a first image according to an aspect of the invention.

At step S202 the input image is received at the server 102. The input image can be in a number of formats such as an individual image or as an individual frame of a video. Preferably, the input image is a frame of video data either raw or encoded in a known manner.

Figure 3:
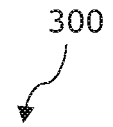
FIG. 3 is an example of an input image divided into a plurality of regions.
Figure 3:
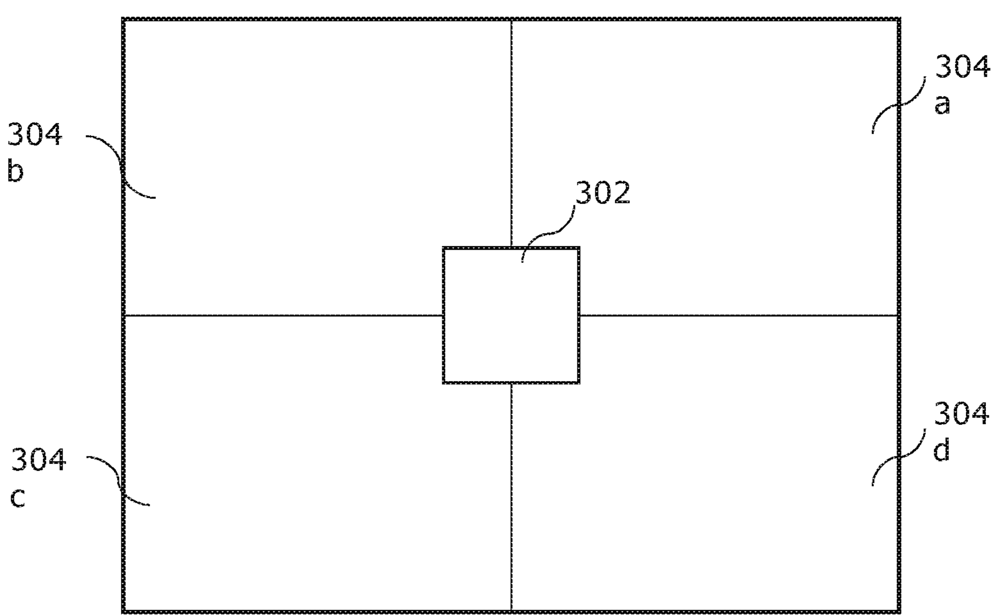

At step S204 the input image is divided into a plurality of regions, an example of how the input image can be divided is shown in FIG. 3.

The input image comprises a foveal region where the user's vision is focussed/has the highest visual acuity/resolution. The foveal region need not be in the centre of the input image but could be at any region of the input image. For this discussion, we assume foveation to be the centre of the input image. The foveal region can be of any size and may depend on one or more of a number of factors including the image itself, user preference, and/or the application in which the method is being used, and is not limited to the example shown in FIG. 3. The remaining portions of the image are termed the peripheral regions. The image can be split into a number of peripheral regions where the user's vision is less focussed/lower visual acuity/resolution. The number of peripheral regions can depend on a number of factors such as the image itself, user preference and/or the computing devices used. The size of each peripheral region can be different from one another and is not limited to each being the same size. The respective sizes of the peripheral regions can depend on one or more factors such as the image itself, user preference, and/or the computing devices used. The reduction in acuity at the periphery is attributed to an effect called pooling or crowding which means that the spatial location of features is irrelevant, and only their aggregate statistics matter.

Whilst the disclosure primarily refers to a foveal region, it should be noted that such discussion can also apply to any other region of the image that should be shown at higher resolution instead of, or as well as, the foveal region.

At step S206 the statistics of the peripheral region(s) are determined. This may be for a number of peripheral regions or for one single peripheral region.

Figure 8:
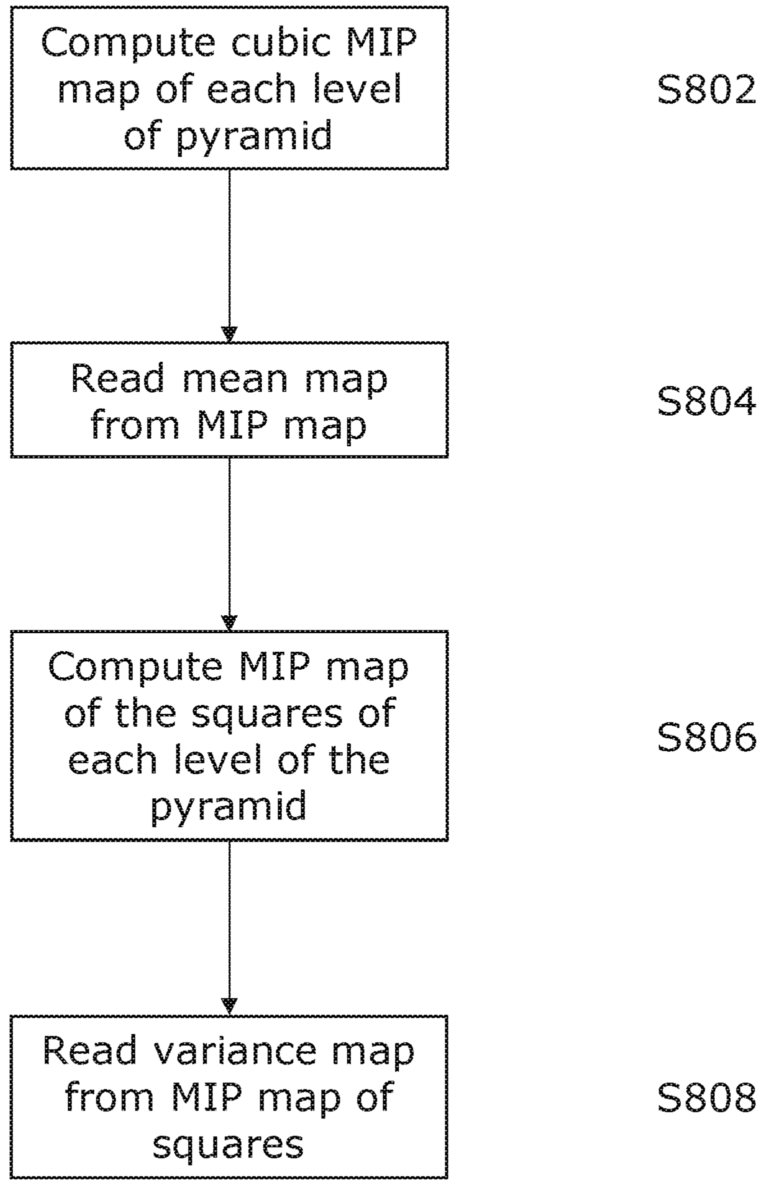
FIG. 8 is a flow chart of the process of determining statistics according to an aspect of the invention.

Preferably such statistics are representative of the moments or distribution of the statistics of features such as colour, intensity or brightness, for example. More preferably, the mean and variance of the statistics are determined. The statistics may be determined by computing a MIP map and extracting the required statistics for each resolution from such maps. A different MIP map may be used for each type of statistic extracted, i.e. a different MIP map may be used to calculate the mean and a different MIP map be used to calculate the variance. An example of how the statistics can be determined is shown in FIG. 8. In another embodiment, the statistics may be calculated using other known methods.

At step S208 a metamer is determined for the peripheral region(s). A metamer is an image or region of an image which is physically different from another source image or region of an image but which is perceived to be the same by a viewer.

The determined metamers have the same statistics as the associated peripheral region such that the peripheral region of an output image is perceived to be the same as the peripheral region of the input image. A metamer refers to physically different images, or regions of images, which can look the same to a user. If there are multiple peripheral regions then a metamer may be determined for each peripheral region to identify multiple metamers each associated with a peripheral region. Alternatively, a metamer may be determined for one or more peripheral regions (i.e. a subset of peripheral regions) rather than all of the peripheral regions of the image.

At step S210 an output image is created. The output image is created from the foveal region of the image and the metamer(s) of the peripheral region(s). The foveal region may be unchanged from the input image or may be modified by way of compression, for example. The output image is perceived to be the same/substantially the same as the input image. The output image is not identical to the input image but rather is perceived to be the same by a user due to the loss in visual acuity in the peripheral region which results in a viewer perceiving different images with the same statistics as being identical. If metamers are determined only for a subset of peripheral regions, the output image can be constructed from the foveal region, the one or more metamers of the one or more peripheral regions, and the remaining unchanged peripheral regions.

In this way, identified regions of an image are analysed to extract statistics of the region such that when the output image is constructed, the statistics of the regions can be relied on rather than the full resolution regions in the periphery. This produces an image requiring less computational power whilst being more representative of how the Human Visual System (HVS) perceives the periphery. In particular, the method allows for efficient computation without a perceived loss of quality of the image. The periphery of the output image is not unrealistically blurry but rather represents the periphery as viewed by the HVS. Further, the employed method results in the more realistic periphery in a way that can be computed in real-time as opposed to other methods which can take far longer to produce an output image.

FIG. 3 shows an example of an input image 300. This is an example only, in alternative embodiments the image may be divided in different ways. For example, the foveal region could be in a different location and/or of a different size, the peripheral regions could be in a different location and/or of a different size, the number of peripheral regions may vary, the sizes of the peripheral regions may each be of different sizes to one another, the foveal region and the peripheral regions may be of the same/different size, etc.

The input image has been divided into a plurality of regions. In the centre of the input image is a foveal region 302 where the user's vision is typically focussed, preferably the foveal region is rendered at the highest resolution. Whilst FIG. 3 shows the foveal region in the centre of the image, it is possible that the foveal region be located elsewhere in the image. The rest of the input image is divided into peripheral regions 304*a*, 304*b*, 304*c*, 304*d*. Whilst FIG. 3 shows four peripheral regions, the invention is not limited to four. The input image may have one or more peripheral regions, four peripheral regions are shown in FIG. 3 as an example only. Similarly, whilst FIG. 3 shows peripheral regions of the same size, the peripheral regions can be of different sizes and shape.

Figure 4:
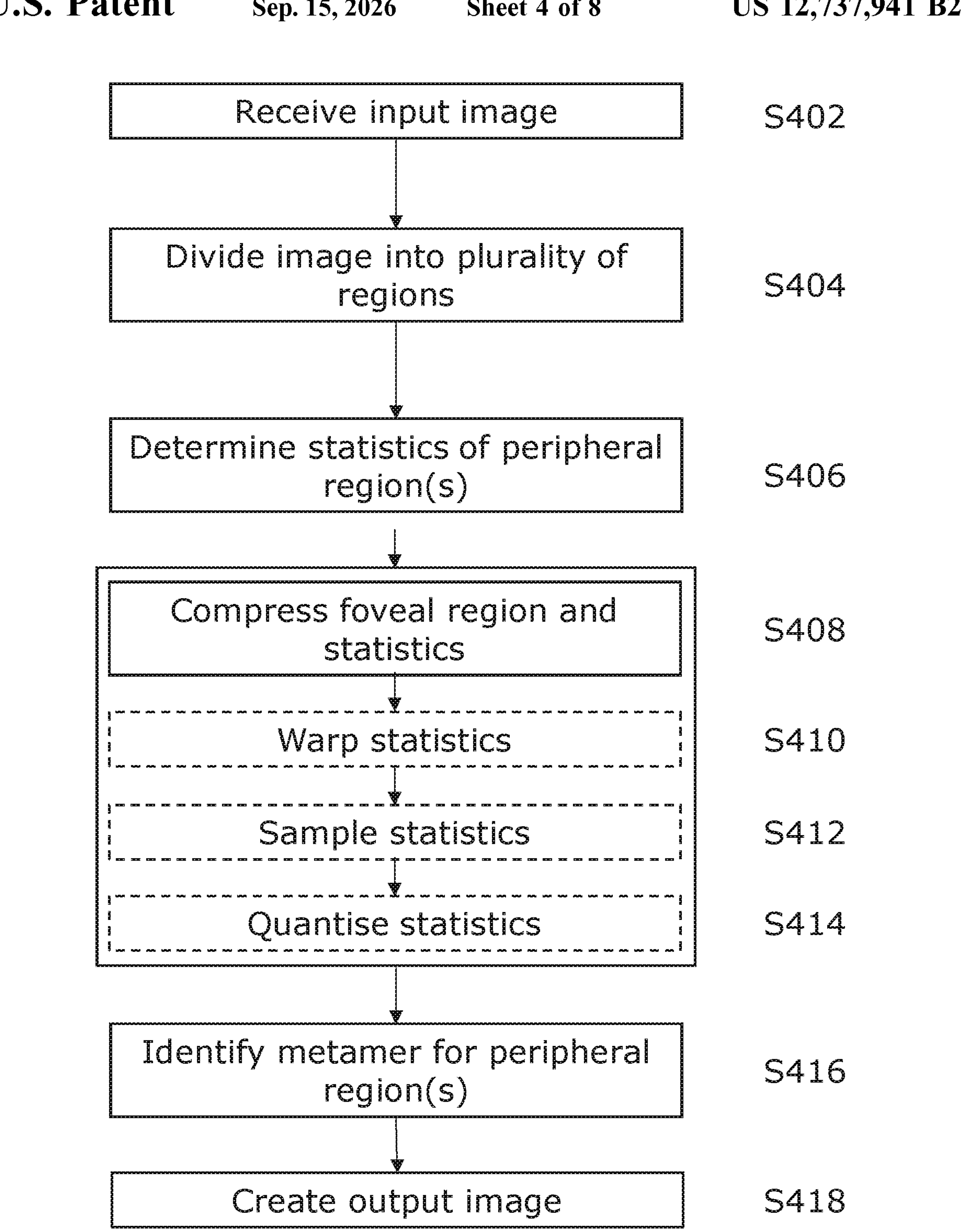
FIG. 4 is a flow chart of the process of creating a metamer using compression according to an aspect of the invention.

FIG. 4 is a flowchart of a further example of a metamerisation process. The process is compatible with the processes shown in FIGS. 2, 4, 6, 7 and 8.

Advantageously, the process shown in FIG. 4 provides a less computationally demanding method whilst producing an image without a perceived loss of quality in the periphery. The computational demand is further reduced in this method by compressing the statistics. This reduces bandwidth while still producing plausible details in the periphery. This is particularly advantageous when transmitting the statistics from one device to another.

Some of the following steps are equivalent to the steps discussed in relation to FIG. 2 such that less detail has been provided in the following paragraphs. In particular, step S402 may be equivalent to step S202, step S404 may be equivalent to step S204, step S406 may be equivalent to step S206, step S416 may be equivalent to step S208, and step S418 may be equivalent to step S210.

At step S402 the input image is received at the server 102.

At step S404 the input image is divided into a plurality of regions, as shown in FIG. 3. The input image comprises a foveal region and a number of peripheral regions.

At step S406 the statistics of the peripheral region(s) are determined. This may be for a number of peripheral regions or for one single peripheral region.

At step S408 the foveal region of the input image and the statistics associated with the peripheral region(s) are compressed. Examples of suitable methods of compression include chroma subsampling, fractal compression, transform coding, and run-length encoding.

This application is particularly advantageous when transferring images such as plain photos and video frames, including remote-rendered content from the server 102 to the computing device 108. The metamer analysis and compression happens at a server. Instead of sending updated images, the server sends updated statistics. The computing device 108 is then free to realize any metamer to fit the statistics. As the statistics are much smaller than the image, bandwidth is reduced while still producing plausible details in the periphery.

Optionally, to reduce the size of the statistics, three steps are employed for encoding: warping, sampling and quantization. The inverse of those steps is used in reverse order at decoding time.

Optionally, the statistics are warped at step S410. The pooling region size can vary over the input image. If a pooling region, for example, in the periphery is 10×10 pixels in size, not all 100 pixels are stored, but only its statistics, a much smaller set of values. To achieve this, the images are warped, such that the local pixel density, which is constant in a common image, becomes proportional to the pooling. In practice, areas that are in the periphery have a density below one and hence shrink. Warping is a common approach for compression of foveated images when applied to the image alone. It is known to use the acuity function for warping where multiple input pixels in the periphery are mapped to a single output pixel and hence averaged. An embodiment of the claimed invention instead allows for the statistics of the averaged areas to be preserved. To achieve this, both the image in the fovea and the statistics in the periphery can be compressed.

Optionally, a steerable pyramid is computed, preferably by applying a pair of direction sensitive filters (horizontal and vertical, for example) to every level, followed by a sub-sampling step. The statistics are then computed from the pyramid. The image pyramid is discussed in more detail in relation to FIG. 7.

For formalization, we will work in the polar domain where the horizontal axis is radius r and the vertical axis is angle θ. Optionally, another domain such as Cartesian could be used. In the polar domain, pixel density is constant along angle θ, and only varies with radius r. Hence functions mapping radius r to pixel density d(r) are used. These functions are different for the image and its statistics. For the image itself, it is the classic acuity/pooling function that drops off from the centre, for example $d_0(r)=r^{-2}$. If the statistics map level has a pixel density lower than the image, the density can be 0 because the statistics at radii where the original image signal is present in the image are not needed, i.e. the foveal region.

Figure 5:
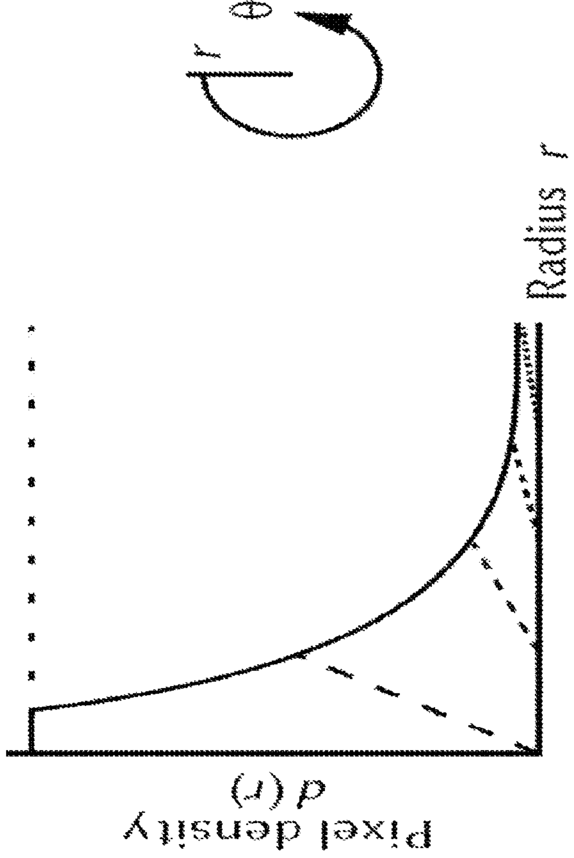
FIG. 5 is an example of pixel density as a function of radius of the input image.

A graph of pixel density is shown in FIG. 5 which shows a graph of pixel density as a function of radius where the pixel density is 0 in the foveal region. This is shown for different levels of an image pyramid. Such an image pyramid is discussed in detail with respect to step S706 of FIG. 7.

So all density functions for the pyramid can be 0 in the fovea as this is transmitted unchanged. This already eliminates storage for the vast part of the pyramid and allows bandwidth to be steered to the periphery. If the original image loses details of scale $2^l$ at some radius r (say 8 pixels compress to 1), the statistics map has to represent them, so the pixel density $d_l$ at r has to be larger than zero (the statistics of those 8 pixels are required). The resolution at which statistics are required also falls off, as statistics are pooled over increasingly large regions, just as the image is. So while having to increase and peak at the point where statistics are most important, they can also fall down rapidly as pooling regions grow.

Advantageously the statistics are compressed to achieve sufficiency and compactness. The statistics needed have to be preserved to the level a metamer needs, i.e. sufficient and those statistics only need to have the resolution that is required, not more, i.e. compact. If it was not compact, the compression advantage of foveation would be lost. If it was insufficient, blur would be produced.

Optionally, at step S412 the statistics are sampled to apply the warp to the original image as well as to every level of the pyramid. The Cumulative Density Function (CDF) D(r) of d(r) is computed and holds the accumulate density up to radius r. The inverse of this function is $D^{-1}(y)=r$. The image or the pyramid levels are sampled at regular levels $D^{-1}(y)$ for $y\varepsilon(0, 1)$.

$D^{-1}(y)$ is many-to-one, i.e., many input pixels from the image or pyramid level map to one output pixel. Simply picking the single pixel nearest to the inversely-mapped position will alias and not produce the correct statistics. Instead, suitable known methods are used to produce a map of statistics with a controlled pixel density. As an example, the following steps are applied. Firstly, if the input is N×M pixels, the input is sampled to an output resolution of size (R·N)×M where R is some bound for the compressiveness. In some examples, R=32. In this approach, aliasing is prevented as for every output pixel there is no more than one input pixel. Secondly, this temporary image may be resampled to the desired output by averaging groups of R pixels into one. As well as averaging the pixels, the squares of the pixels may also be averaged. This produces a map of statistics with a controlled pixel density.

Optionally, at step S414 the statistics are quantised. The resulting warped image and statistics maps can be further compressed. Each channel of each statistics map may be remapped linearly to [0, 255], for example. Each map may then be quantised to 8 bits per channel, for example, and compressed. Such compression may be using JPEG. Optionally, further signal-dependent equalisation or specific custom quantisation tables may be applied.

At step S416 a metamer is determined for the peripheral region(s). If there are multiple peripheral regions then a metamer is determined for each peripheral region to identify multiple metamars each associated with a peripheral region.

At step S418 an output image is created. The output image is created from the foveal region of the image and the metamer(s) of the peripheral region(s). The output image is perceived to be the same as the input image.

Figure 6:
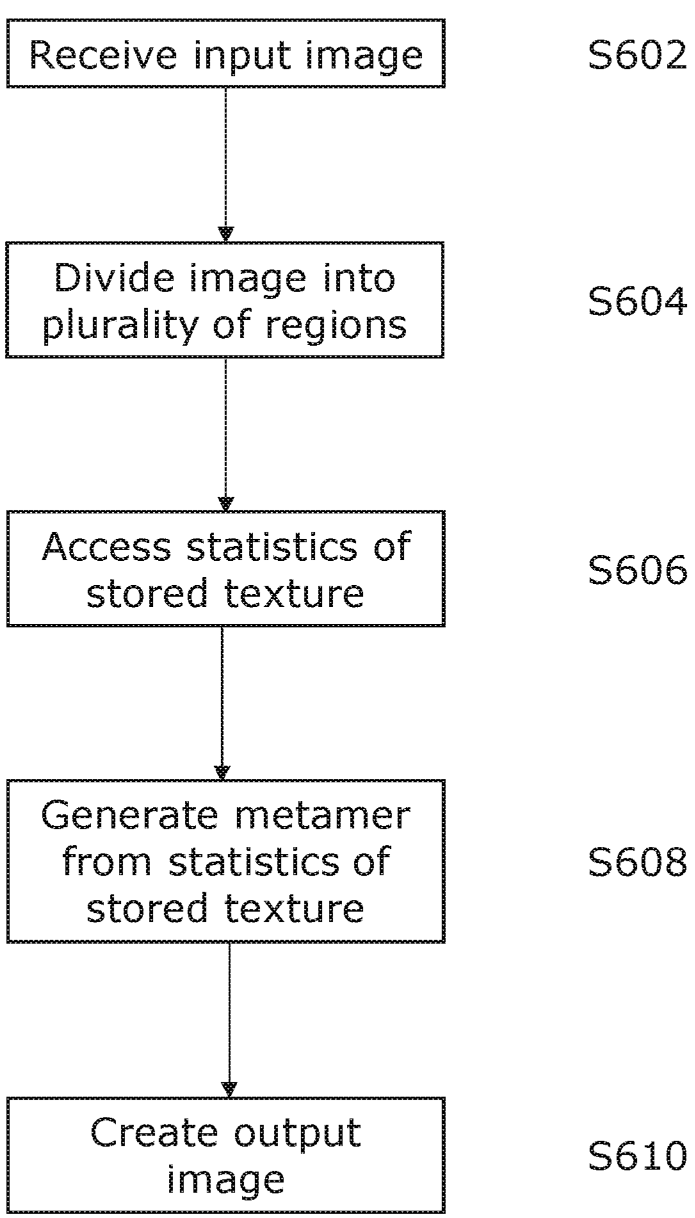
FIG. 6 is a flow chart of the process of creating a metamer using texture synthesis according to an aspect of the invention.

FIG. 6 is a flowchart of a further example of a metamerisation process which is compatible with the processes shown in FIGS. 2, 4, 7 and 8.

The process in FIG. 6 includes a texturing step. This allows metamers to be synthesised in screen space but from statistics stored in textures. As the statistics of an image are more compact than the image itself, bandwidth can be saved by accessing the statistics. Further, as storing the textures is a pre-process, any filter can be used as fast analysis may not be needed in this application.

Some of the following steps are equivalent to the steps discussed in relation to FIG. 2 such that less detail has been provided in the following paragraphs. In particular, step S602 may be equivalent to step S202, step S604 may be equivalent to step S204, and step S610 may be equivalent to step S210.

At step S602 the input image is received at the server 102.

At step S604 the input image is divided into a plurality of regions, as shown in FIG. 3. The input image comprises a foveal region and a number of peripheral regions. The number of peripheral regions can depend on the image itself.

At step S606 the statistics of a stored texture are accessed. Advantageously, the pooled statistics of an image are more compact than the image itself as pooling removes details and can be stored in a lower resolution. Hence, accessing the statistics can save bandwidth.

To create the stored texture ahead of the metamerisation process, a pyramid of the texture is built. This texture can have any arbitrary size providing the statistics can be computed. Any filter in the Fourier basis can be used to create the pyramid as quick analysis is not required. A moment map for the texture is computed and stored. Preferably, only the foveated part of the texture is held in memory.

When accessing the statistics, it is preferable to only access the moments required in the framebuffer. This may be achieved by picking the correct pyramid level and by picking the correct pooling size.

To choose the right pyramid level, the following example is considered. Consider an image with texture resolution N and a rendering resolution M. Further consider a pixel in the rendered framebuffer having a pixel-to-texel ratio logarithm $\rho$. This value depends on view, texture coordinate and geometry in a complex way but can be computed from m, N and the texture coordinate derivatives following the OpenGL specification for MIP level selection. For an orthographic fronto-parallel view on a texture quad texture geometry fitting the screen, $\rho=3$ as every pixel maps to $(2^3)^2$ texels. To fill the framebuffer at resolution M with respect to level 0, pyramid level $\rho$ is used.

To pick the right pooling for every pixel in the framebuffer pyramid, the spatial position is considered. Generally, pixels close to the fovea pool over small regions and pixels at the periphery pool over large regions. Consider a pixel that has the quadratic pooling region of log-edge length $\eta$ in screen space. The statistics of the texture can be accessed by looking up the MIP level $\eta-\rho$ in pyramid level $\rho+\eta$. This texture holds the pooled statistics which are at a low-resolution. The values from $\rho+\eta$ are used as a low-pass and the details accessed between $\rho$ and $\rho+\eta$ are added. This instantiates a metamer with those statistics which produces a texture signal of $\rho$.

The above method does not require a pyramid to be filled with moments but creates a shader that generates the texture value by simply adding up $\rho-\eta$ noise values, scaled by the mean and variance and the low-pass value $\rho$. A shader can alternatively be generated using well known methods.

In another embodiment, the textures are accessed by any well-known method which allows the statistics of a texture corresponding to a peripheral region to be accessed. Preferably, such a method allows the statistics to be accessed in real-time.

At step S608 metamers are generated from the stored statistics for each peripheral region requiring a metamer. The metamers are synthesised in screen space at the time of application.

At step S610 an output image is created. The output image is created from the foveal region of the image and the metamer(s) of the peripheral region(s) which are generated from accessing the statistics of the stored texture. The output image is perceived to be the same as the input image.

Figure 7:
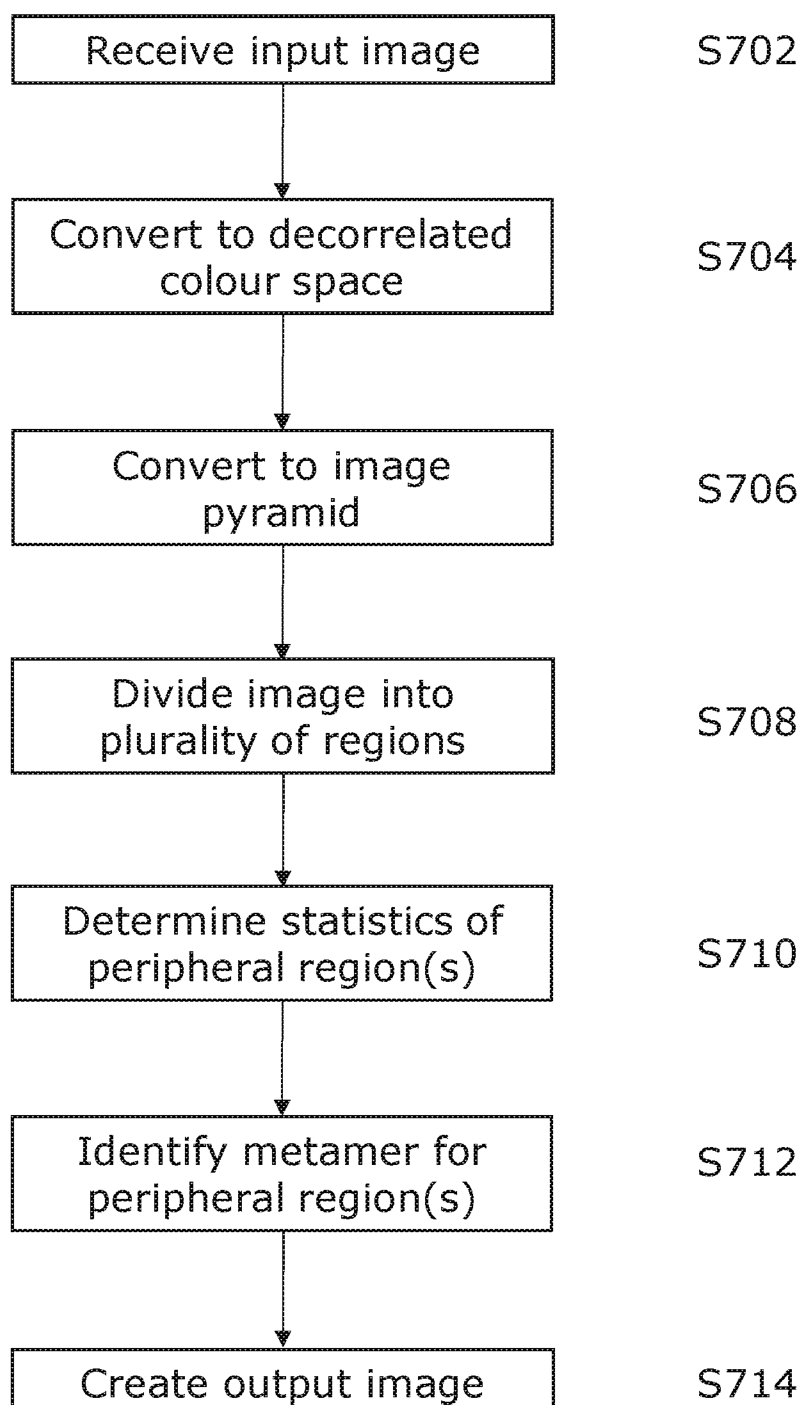
FIG. 7 is a flow chart of the process of creating a metamer according to an aspect of the invention.

FIG. 7 is a flowchart of a further example of a metamerisation process. The process is compatible with the processes shown in FIGS. 2, 4, 6 and 8.

The process in FIG. 7 contains additional steps conducted before determining the statistics. Such steps further optimise the process. In particular, converting the image to a decorrelated colour space is beneficial as co-statistics between feature channels are not captured in this process. Further, the ventral stream is sensitive to features at all scales and features are related to changes over space. An image pyramid is ideal to capture both properties.

Some of the following steps are equivalent to the steps discussed in relation to FIG. 2 such that less detail has been provided in the following paragraphs. In particular, step S702 may be equivalent to step S202, step S708 may be equivalent to step S204, step S710 may be equivalent to step S206, step S712 may be equivalent to step S208, and step S714 may be equivalent to step S210.

At step S702 the input image is received at the server 102.

At step S704 the input image is converted to a decorrelated colour space. Preferably, the decorrelated colour space is YCbCr. Examples of alternative colour spaces which can be used include YCoCg, YUV or YCC.

At step S706 the decorrelated input image is converted to an image pyramid. Preferably, the image pyramid is such that the response at in-between orientations is a linear combination of the response at the directions in which a filter is applied. More preferably, the image pyramid is a steerable pyramid. A steerable pyramid applies a pair of direction sensitive filters (horizontal and vertical, for example) to every level, followed by a sub-sampling step. Advantageously, steerability assures that the response at in-between orientations is a linear combination of the response at the two main directions. Preferably, compact filters are used for a real-time application. For example, 3×3, 4×4, or 9×9 filters could be used. More preferably, 5×5 filters are used. Filters in the Fourier domain can be used if the application does not require real-time synthesis. For example, Fourier-based (ground truth) steerable filters can be used if the statistics are to be produced in a pre-process, such as in the texturing application.

Advantageously, an image pyramid can capture features at all scales and features relating to changes over space. Further, converting to an image pyramid allows the statistics to be computed efficiently, as discussed in relation to FIG. 8. Specifically, converting to an image pyramid allows operations to be applied to each level of the image pyramid to produce MIP maps.

At step S708 the input image is divided into a plurality of regions, for example as shown in FIG. 3. The input image comprises a foveal region and a number of peripheral regions. The number of peripheral regions can depend on the image itself.

At step S710 the statistics of the peripheral region(s) are determined. This may be for a number of peripheral regions or for one single peripheral region. This is discussed in more detail in relation to step S206 of FIG. 2. Preferably, the statistics are determined following the process discussed in relation to FIG. 8.

At step S712 a metamer is identified for the peripheral region(s). The identified metamers have the same statistics as the associated peripheral region such that the peripheral region of an output image is perceived the same as the peripheral region of the input image. If there are multiple peripheral regions then a metamer is determined for each peripheral region to identify multiple metamers each associated with a peripheral region. Identifying a metamer is discussed in more detail in relation to step S208 of FIG. 2.

At step S714 an output image is created. The output image is created from the foveal region of the image and the metamer(s) of the peripheral region(s). The foveal region may be unchanged from the input image or may be modified by way of compression, for example. The output image is perceived to be the same as the input image.

FIG. 8 is a flowchart of a process for determining the statistics. The process shown in FIG. 8 is compatible with the processes shown in FIGS. 2, 4, 6, and 7.

At step S802 a cubic MIP map of each level of an image pyramid is computed. Preferably, the image pyramid is a steerable pyramid. The MIP map is created in a known manner. In other embodiments, other MIP maps other than a cubic MIP map can be computed for each level of an image pyramid.

At step S804 a mean map may be read directly from the cubic MIP map. The mean map may be read using a function in the chosen language which copies pixel values from the per-pixel MIP level corresponding to bandwidth σ using tri-cubic interpolation. For example, in Python, the mean map may be read directly by using a select(mip(L), σ) function where mip(L) is the cubic MIP map.

At step S806 a MIP map of the squares of each level of the pyramid is computed, mip($L^2$). Such a map allows the variance to be read. In alternative embodiments, other MIP maps may be used which allow the variance to be read or calculated from the MIP map.

At step S808 a variance map can be read from the MIP map of squares. The variance can be read by blurring the square map with the spatially-varying pooling blur and subtracting the square-of-mean from the mean-of squares to arrive at variance. For example, in Python, the square map may be blurred using a select(mip($L^2$), r) function.

The approaches described herein allow for an effective method of creating a metamer for an image. Such an approach is particularly effective for near eye displays where the extended field of view of the display, and the variations in human eye resolution mean that variations in the display of the image can result in a reduction in computational requirement without a perceived drop in quality to the end user. Similarly the process is effective for augmented reality displays where similar considerations exist. The process is also particularly effective for mobile telephones and mobile telephone applications.

The invention claimed is:

1. A method of creating a metamer from an input image, the method comprising:

receiving by a data processing device a first input image;

dividing, by the data processing device, the input image into a plurality of regions comprising a foveal region and at least one peripheral region, wherein each region of the plurality of regions comprises a plurality of pixels;

determining, by the data processing device, for each of the at least one peripheral region, a distribution of statistics associated with each of the at least one peripheral region;

for each of the at least one peripheral region, identifying, by the data processing device, a metamer for the peripheral region wherein the metamer has at least substantially similar distribution of statistics to the associated peripheral region; and creating, by the data processing device, a revised image based on the foveal region and the metamer for each of the at least one peripheral region such that a corresponding peripheral region of the output image is perceived to be the same as its corresponding peripheral region of the input image when perceived by a viewer of the image.

2. The method of claim 1, further comprising compressing the foveal region and the distribution of the statistics for each of the at least one peripheral region to produce updated statistics to identify a metamer for each of the at least one peripheral region wherein the updated statistics resemble the distribution of the original statistics for each peripheral region.

3. The method of claim 2, wherein the foveal region and the distribution of statistics are compressed by warping the foveal region and the distribution of statistics by calculating a Cumulative Density Function to produce a map of statistics with a controlled pixel density.

4. The method of claim 3, wherein the foveal region and the distribution of statistics are further compressed by remapping each channel of each statistics map linearly to [0, 255] and quantizing each map to 8 bits per channel.

5. The method of claim 3, wherein the Cumulative Density Function in the at least one peripheral region is larger than the Cumulative Density Function in the foveal region.

6. The method of claim 1, further comprising accessing, for each of the at least one peripheral region, the statistics of a stored texture having the same texture as the peripheral region and generating the metamer from these statistics.

7. The method of claim 1, wherein the input image is a frame of video data.

8. The method of claim 1, wherein the distribution of the statistics are one or both of mean and variance of the statistics.

9. The method of claim 1, further comprising converting the input image into a decorrelated colour space before dividing the image into a plurality of regions.

10. The method of claim 1, further comprising converting the input image into a steerable pyramid comprising a plurality of levels before dividing the image into a plurality of regions.

11. The method of claim 10, wherein the steerable pyramid applies a pair of direction sensitive filters to every level of the steerable pyramid followed by a sub-sampling step.

12. The method of claim 11, wherein the filters are compact filters for a real-time application.

13. The method of claim 10, wherein the step of determining the distribution of statistics comprises constructing a cubic MIP map of each level of the steerable pyramid, reading a mean map from the cubic MIP map, and computing a variance map from a MIP map of the squares of each level.

14. A system for creating a metamer for an input image, the system comprising:

a display for rendering an image; and a processor configured to perform:

receiving a first input image;

dividing the input image into a plurality of regions comprising a foveal region and at least one peripheral region, wherein each region of the plurality of regions comprises a plurality of pixels;

determining, for each of the at least one peripheral region, a distribution of statistics associated with each of the at least one peripheral region;

for each of the at least one peripheral region, identifying a metamer for the peripheral region wherein the metamer at least has substantially similar distribution of statistics to the associated peripheral region; and creating an output image based on the foveal region and the metamer for each of the at least one peripheral region such that a corresponding peripheral region of the output image is perceived to be the same as its corresponding peripheral region of the input image when perceived by a viewer of the image.

15. The system of claim 14 wherein the display is a near eye display.

16. One or more A-non-transitory computer readable media comprising instructions which, when is executed by a computer, cause the computer to perform:

receiving a first input image;

dividing the input image into a plurality of regions comprising a foveal region and at least one peripheral region, wherein each region of the plurality of regions comprises a plurality of pixels;

determining, for each of the at least one peripheral region, a distribution of statistics associated with each of the at least one peripheral region;

for each of the at least one peripheral region, identifying a metamer for the peripheral region wherein the metamer at least has substantially similar distribution of statistics to the associated peripheral region; and creating an output image based on the foveal region and the metamer for each of the at least one peripheral region such that a corresponding peripheral region of the output image is perceived to be the same as its corresponding peripheral region of the input image when perceived by a viewer of the image.

17. The computer readable media of claim 16 wherein the output image is created for rendering on a near eye display.

* * * * *